United States Patent
Jin et al.

(10) Patent No.: US 12,542,442 B2
(45) Date of Patent: Feb. 3, 2026

(54) AUXILIARY POWER CIRCUIT, ELECTRONIC DEVICE, AND METHOD FOR OPERATING AUXILIARY POWER CIRCUIT

(71) Applicant: SK hynix Inc., Icheon (KR)

(72) Inventors: Su Il Jin, Icheon (KR); Dal Gon Kim, Icheon (KR); Na Yeong Kim, Icheon (KR)

(73) Assignee: SK hynix Inc., Icheon (KR)

( * ) Notice: Subject to any disclaimer, the term of this patent is extended or adjusted under 35 U.S.C. 154(b) by 570 days.

(21) Appl. No.: 18/065,482

(22) Filed: Dec. 13, 2022

(65) Prior Publication Data
US 2023/0307939 A1 Sep. 28, 2023

(30) Foreign Application Priority Data
Mar. 25, 2022 (KR) .................... 10-2022-0037043

(51) Int. Cl.
  H02J 7/00 (2006.01)
  G11C 5/14 (2006.01)
  H02J 7/34 (2006.01)
  H02M 3/04 (2006.01)

(52) U.S. Cl.
  CPC .............. *H02J 7/345* (2013.01); *G11C 5/147* (2013.01); *H02J 7/0047* (2013.01); *H02J 7/0063* (2013.01); *H02J 7/007182* (2020.01); *H02M 3/04* (2013.01); *H02J 2207/20* (2020.01); *H02J 2207/50* (2020.01)

(58) Field of Classification Search
None
See application file for complete search history.

(56) References Cited

U.S. PATENT DOCUMENTS

| | | | |
|---|---|---|---|
| 8,536,838 B2 * | 9/2013 | Hooker | G01R 31/64 361/15 |
| 2005/0058589 A1 * | 3/2005 | Lundquist | H01M 4/96 423/445 R |
| 2007/0001684 A1 * | 1/2007 | Kawamura | G01R 19/2503 324/522 |
| 2009/0134851 A1 * | 5/2009 | Takeda | H02M 3/07 323/234 |
| 2017/0069356 A1 | 3/2017 | Schmidt et al. | |
| 2018/0323699 A1 | 11/2018 | Carpenter, Jr. et al. | |
| 2021/0231720 A1 | 7/2021 | Butler et al. | |

FOREIGN PATENT DOCUMENTS

CN 108802554 A 11/2018
KR 1020210030079 A 3/2021

OTHER PUBLICATIONS

Notice of Submission of Opinion for Korean Patent Application No. 10-2022-0037043, dated Dec. 3, 2025.

* cited by examiner

Primary Examiner — Arun C Williams

(57) ABSTRACT

An auxiliary power circuit may measure a first time during which the voltage level of a capacitor falls from a first level to a second level by a leakage current of the capacitor, may charge the capacitor to a third level, may measure a second time during which the voltage level of the capacitor falls from the third level to a fourth level by the leakage current of the capacitor and a discharge current of a current source, may calculate a capacitance of the capacitor based on the first level, the second level, the first time, the third level, the fourth level, the second time and the discharge current of the current source, and may determine the state of the capacitor based on the calculated capacitance of the capacitor.

15 Claims, 10 Drawing Sheets

AUXILIARY POWER CIRCUIT, ELECTRONIC DEVICE, AND METHOD FOR OPERATING AUXILIARY POWER CIRCUIT

CROSS-REFERENCE TO RELATED APPLICATION

The present application claims priority under 35 U.S.C. § 119(a) to Korean Patent Application No. 10-2022-0037043 filed on Mar. 25, 2022, which is incorporated herein by reference in its entirety.

BACKGROUND

1. Technical Field

Various embodiments generally relate to an auxiliary power circuit, an electronic device, and a method for operating an auxiliary power circuit.

2. Related Art

An electronic device may use, as a power supply source, a is battery or DC or AC power supplied from an outside.

An unexpected sudden power-off (SPO) may occur in the electronic device. The sudden power-off may occur by at least one of various causes, such as a failure of the power supply source or an electrical disconnection between the electronic device and the power supply source.

When the sudden power-off occurs in the electronic device, unrecoverable damage may be caused in the electronic device. In particular, when the electronic device includes an electronic storage medium such as a memory storing user data, the user data may be lost or damaged due to a sudden power supply interruption, and thus the reliability of the electronic device may not be guaranteed.

SUMMARY

Various embodiments are directed to an auxiliary power circuit, an electronic device, and a method for operating the auxiliary power circuit, capable of calculating the capacitance of a capacitor in the auxiliary power circuit by correcting a leakage current of the capacitor.

In an embodiment, an auxiliary power circuit may include: at least one capacitor configured to store reserve power; a current source configured to discharge charges charged in the capacitor; a voltage detector configured to detect a voltage level of the capacitor; and an auxiliary power controller configured to, when monitoring a state of the capacitor, measure a first time during which the voltage level of the capacitor falls from a first level to a second level by a leakage current of the capacitor, charge the capacitor to a third level, measure a second time during which the voltage level of the capacitor falls from the third level to a fourth level by the leakage current of the capacitor and a discharge current of the current source, calculate a capacitance of the capacitor based on the first level, the second level, the first time, the third level, the fourth level, the second time and the discharge current of the current source, and determine the state of the capacitor based on the calculated capacitance of the capacitor.

In an embodiment, an electronic device may include: a memory unit configured to store data; a power management circuit configured to provide power to the memory unit; and an auxiliary power circuit including at least one capacitor storing reserve power and a current source discharging charges charged in the capacitor, and the auxiliary power circuit is configured to supply the reserve power stored in the capacitor to the power management circuit when a sudden power-off occurs, and, when monitoring a state of the capacitor, measure a first time during which a voltage level of the capacitor falls from a first level to a second level by a leakage current of the capacitor, charge the capacitor to a third level, measure a second time during which the voltage level of the capacitor falls from the third level to a fourth level by the leakage current of the capacitor and a discharge current of the current source, calculate a capacitance of the capacitor based on the first level, the second level, the first time, the third level, the fourth level, the second time and the discharge current of the current source, and determine the state of the capacitor based on the calculated capacitance of the capacitor.

In an embodiment, a method for operating an auxiliary power circuit may include: measuring a first time during which a voltage level of the capacitor falls from a first level to a second level by a leakage current of the capacitor; charging the capacitor to a third level, and measuring a second time during which the voltage level of the capacitor falls from the third level to a fourth level by the leakage current of the capacitor and a discharge current of the current source; calculating a capacitance of the capacitor based on the first level, the second level, the first time, the third level, the fourth level, the second time and the discharge current of the current source; and determining a state of the capacitor based on the calculated capacitance of the capacitor.

According to the embodiments of the disclosed technology, it is possible to more accurately calculate the capacitance of the capacitor of the auxiliary power circuit by correcting the leakage current of the capacitor.

DETAILED DESCRIPTION

Hereinafter, various embodiments of the present disclosure will be described in detail with reference to the accompanying drawings.

Figure 1:
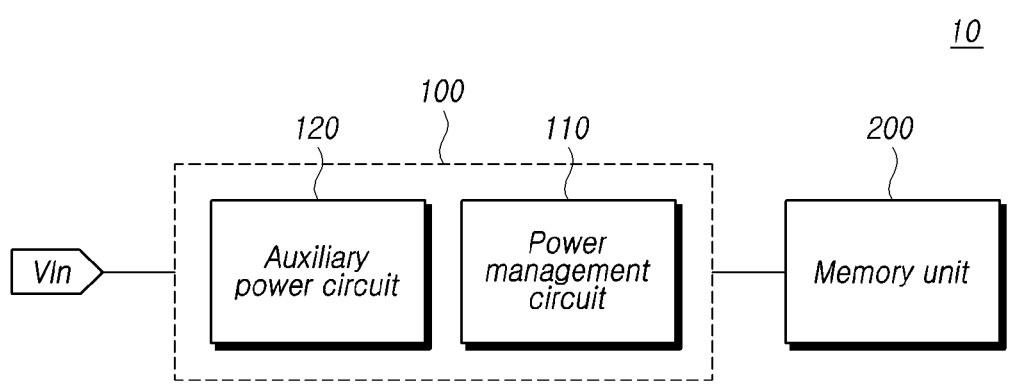
FIG. 1 illustrates an electronic device according to an embodiment of the disclosed technology.

FIG. 1 illustrates an electronic device 10 according to an embodiment of the disclosed technology.

Referring to FIG. 1, the electronic device 10 may include a power supply device 100 and a memory unit 200 for storing data.

The memory unit 200 may include a memory device and a memory controller.

The memory device of the memory unit 200 may include one or more of various memory devices such as a DDR SDRAM (double data rate synchronous dynamic random access memory), an LPDDR4 (low power double data rate 4) SDRAM, a GDDR (graphics double data rate) SDRAM, an LPDDR (low power DDR) SDRAM, an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (SU-RAM), and the like.

The memory controller may control write (or program), read, erase, and background operations for the memory device. For example, the background operation may include at least one among a garbage collection (GC) operation, a wear leveling (WL) operation, a bad block management (BBM) operation, and so forth.

The memory controller may control the operation of the memory device according to a request from an outside, e.g., a host. Unlike this, the memory controller may control the operation of the memory device regardless of a request from the host.

The power supply device 100 may provide the electronic device 10 with power Vin inputted through a power connector from a power supply source.

The power supply device 100 may include a power management circuit 110, which supplies power to the memory unit 200, and an auxiliary power circuit 120, which provides reserve (or backup) power.

The power management circuit 110 may rectify, convert, transform, and distribute the inputted power Vin to activate components included in the electronic device 10, for example, the memory unit 200.

The auxiliary power circuit 120 may provide the memory unit 200 with the reserve power for a predetermined time in order to secure the reliability of data stored in the memory unit 200, when a sudden power-off (SPO) occurs.

The power management circuit 110 and the auxiliary power circuit 120 may be configured by separate integrated circuits (ICs) or may be configured by one integrated circuit.

When the sudden power-off occurs, the electronic device 10 may detect the occurrence of the sudden power-off and perform a power loss protection (PLP) operation.

Since the electronic device 10 depends only on the power of the auxiliary power circuit 120 after the power supply by the power supply source is interrupted, it is important to secure the reliability of the auxiliary power circuit 120. The auxiliary power circuit 120 may charge the reserve power in a capacitive element and provide the reserve power to the electronic device 10 when the sudden power-off occurs. The auxiliary power circuit 120 may monitor a state of the capacitive element in order to secure the reliability of the capacitive element. A capacitor may be used as the capacitive element.

Figure 2:
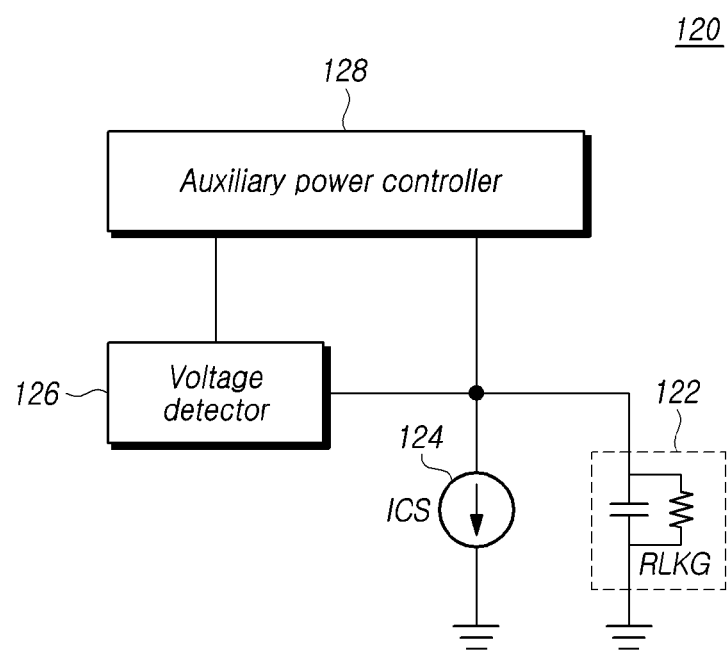
FIG. 2 illustrates an auxiliary power circuit according to an embodiment of the disclosed technology.

FIG. 2 illustrates an auxiliary power circuit 120 according to an embodiment of the disclosed technology. The auxiliary power circuit 120 illustrated in FIG. 2 may correspond to the auxiliary power circuit 120 shown in FIG. 1.

Referring to FIG. 2, the auxiliary power circuit 120 may include at least one capacitor 122 which stores reserve power, a current source 124 which discharges charges stored in the capacitor 122, a voltage detector 126 which detects a voltage level of the capacitor 122, and an auxiliary power controller 128 which controls the operations of the current source 124 and the voltage detector 126.

The capacitor 122 may store the reserve power and provide the reserve power to temporarily drive the electronic device 10 when a sudden power-off occurs.

However, a leakage current may exist in the capacitor 122, i.e., the charges stored in the capacitor 122 may be discharged from the capacitor 122. In FIG. 2, a parallel resistor RLKG, which is coupled in parallel to the capacitor 122, can be a path through which the leakage current flows. Accordingly, unless power is continuously supplied to the auxiliary power circuit 120 from an outside, the reserve power of the capacitor 122 may be discharged by the leakage current, and thus the voltage level of the capacitor 122 may be lowered.

The capacitor 122 may be an electrolytic capacitor, a tantalum capacitor, a film capacitor, a ceramic capacitor, or the like according to a material of a dielectric used to form the capacitor 122.

The electrolytic capacitor uses a thin oxide layer as a dielectric and uses aluminum as an electrode. In the electrolytic capacitor, since the dielectric may be made thin, a capacitance-to-volume ratio is large, and thus, a large capacitance may be obtained compared to a volume. The electrolytic capacitor includes two electrodes, e.g., a cathode and an anode.

In the tantalum capacitor, an electrode is made of tantalum, and the tantalum capacitor includes a cathode and an anode. In the tantalum capacitor, a change of a capacitance that is caused by a temperature and a DC voltage of a circuit is small.

The film capacitor may have a structure in which a dielectric film of polypropylene is placed between electrodes made of aluminum and/or copper and then wound into a roll. The characteristics of the film capacitor may be changed depending on a material and a manufacturing process thereof. Among film capacitors, a Mylar capacitor uses a polyester film and has a cylindrical structure.

In the ceramic capacitor, a material having a high dielectric constant such as barium titanate may be used as a dielectric. A multilayer ceramic capacitor (MLCC), which is a type of the ceramic capacitor, may use a high-k ceramic of a multilayer structure.

As described above, the capacitor 122 may be made of various materials and have various structures. The above-described types of capacitors are examples, and embodiments of the disclosed technology are not limited thereto.

As described above, the auxiliary power circuit 120 may include at least one capacitor 122. When the auxiliary power circuit 120 includes a plurality of capacitors 122, the capacitors 122 may be connected to each other in various ways, e.g., in series, in parallel, or in a series and parallel combination. When the capacitors 122 are coupled in parallel, a capacitance thereof may increase. On the other hand, when the capacitors 122 are coupled in series, a capacitance thereof may decrease but a higher voltage can be applied thereto.

The current source 124 measures the capacitance of the capacitor 122 by discharging charges stored in the capacitor 122. The auxiliary power circuit 120 may allow a discharge current ICS to flow through the current source 124. The current source 124 operates under the control of the auxiliary power controller 128. When the auxiliary power circuit 120 operates to charge reserve power in the capacitor 122, the current source 124 may cut off the flow of a current to prevent charges stored in the capacitor 122 from be discharged through the current source 124. When the auxiliary power circuit 120 operates to monitor the state of the capacitor 122, the current source 124 may provide the discharge current ICS for a specific time period.

The voltage detector 126 may detect a voltage level formed in the capacitor 122, and may provide information on the detected voltage level of the capacitor 122 to the auxiliary power controller 128.

The auxiliary power controller 128 may calculate the capacitance of the capacitor 122 and determine the state of the capacitor 122 on the basis of the calculated capacitance of the capacitor 122.

The auxiliary power controller 128 may measure a first time during which the voltage level of the capacitor 122 falls from a first level to a second level by a leakage current of the capacitor 122, may charge the capacitor 122 to a third level, and may measure a second time during which the voltage level of the capacitor 122 falls from the third level to a fourth level by the leakage current of the capacitor 122 and the discharge current ICS by the current source 124.

The auxiliary power controller 128 may calculate the capacitance of the capacitor 122 on the basis of the first level, the second level, the first time, the third level, the fourth level, the second time, and the discharge current ICS of the current source 124.

The leakage current of the capacitor 122 has a relatively large value at an initial stage of the discharge, and then the value of the leakage current enters a saturation region in which the value of the leakage current becomes constant.

When calculating the capacitance of the capacitor 122 based on only the discharge current ICS, since the characteristic of the capacitor 122 is not considered, the calculated capacitance of the capacitor 122 may not be accurate. Therefore, there may be an error in determining the state of the capacitor 122.

According to the embodiment of the disclosed technology, when measuring the capacitance of the capacitor 122, by separately measuring the first time during which the voltage level of the capacitor 122 falls by the leakage current of the capacitor 122, it is possible to correct an error occurred due to the leakage current. Through this, the capacitance of the capacitor 122 may be more accurately calculated. In particular, since the initial leakage current of the capacitor 122 has a large value, a difference in accuracy between the case of measuring the capacitance of the capacitor 122 without considering the leakage current and the case of measuring the capacitance of the capacitor 122 by considering the leakage current may be significant.

Figure 3:
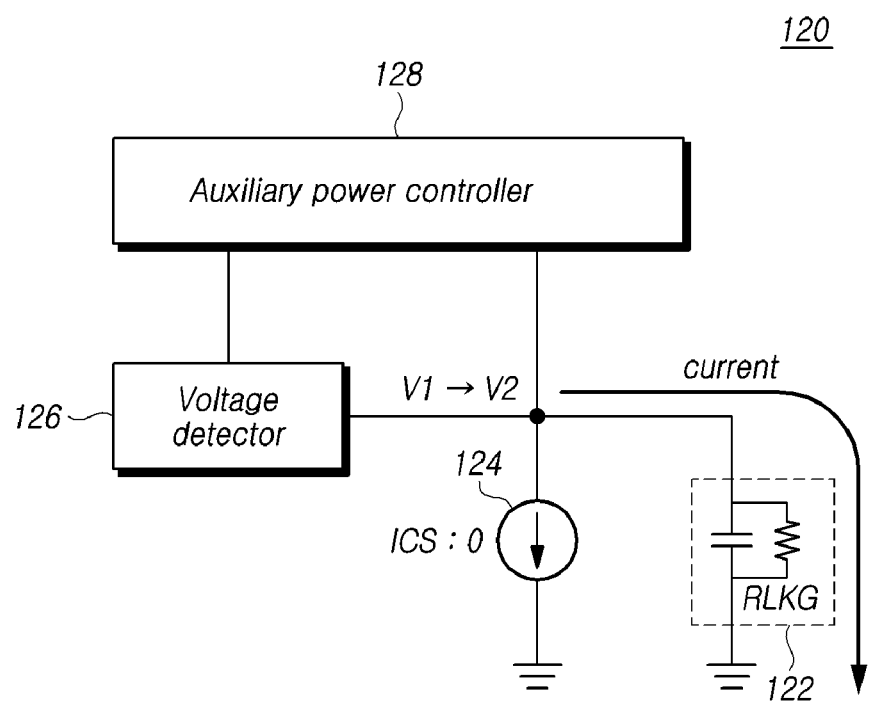
FIG. 3 illustrates a path of a current while an auxiliary power controller measures a first time according to an embodiment of the disclosed technology.

FIG. 3 illustrates a path of a current when the auxiliary power controller 128 measures the first time T1 according to an embodiment of the disclosed technology.

Figure 4:
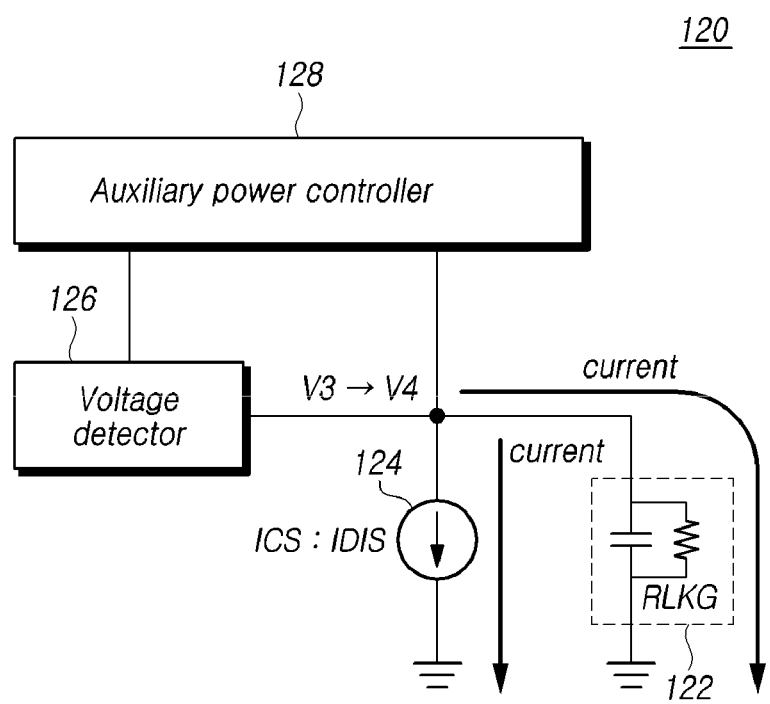
FIG. 4 illustrates paths of currents while the auxiliary power controller measures a second time according to an embodiment of the disclosed technology.

FIG. 4 illustrates paths of currents when the auxiliary power controller 128 measures the second time T2 according to an embodiment of the disclosed technology.

Referring to FIGS. 3 and 4, the auxiliary power controller 128 may measure the first time T1 and the second time T2.

When monitoring the state of the capacitor 122, the auxiliary power controller 128 may set the discharge current ICS of the current source 124 to 0 in order to measure the first time T1. Also, the auxiliary power controller 128 may charge the capacitor 122 to a first level V1 and stop charging the capacitor 122. Since charges stored in the capacitor 122 are not discharged through the current source 124 in which the discharge current ICS is set to 0, a decrease in a voltage level of the capacitor 122 may be due to a leakage current occurring through the parallel resistor RLKG of the capacitor 122. Accordingly, when measuring the first time T1, a path of a discharge current of the capacitor 122 is formed only through the parallel resistor RLKG as shown in FIG. 3.

The auxiliary power controller 128 may detect a change in the voltage level of the capacitor 122 using the voltage detector 126, and may measure the first time T1 during which the voltage level of the capacitor 122 falls from the first level V1 to a second level V2.

In order to measure the second time T2, the auxiliary power controller 128 may set the discharge current ICS of the current source 124 to a non-zero value, for example, IDIS. Also, the auxiliary power controller 128 may charge the capacitor 122 to a third level V3 and stop charging the capacitor 122. Through this, charges stored in the capacitor 122 are discharged as much as IDIS through the current source 124, and a decrease in the voltage level of the capacitor 122 may be due to the leakage current occurring through the parallel resistor RLKG and the discharge current IDIS of the current source 124. Accordingly, as shown in FIG. 4, a path of a discharge current of the capacitor 122 is formed in two branches: one branch being through the parallel resistor RLKG; and the other one being through the current source 124.

The auxiliary power controller 128 may detect a change in the voltage level of the capacitor 122 through the voltage detector 126, and may measure the second time T2 during which the voltage level of the capacitor 122 falls from the third level V3 to a fourth level V4.

The auxiliary power controller 128 may calculate the capacitance of the capacitor 122 using Equation 1.

$$C_{cap} = \frac{I_D}{\left(\frac{V_3 - V_4}{T_2} - \frac{V_1 - V_2}{T_1}\right)},$$ [Equation 1]

where Ccap is the capacitance of the capacitor 122, $I_D$ is a discharge current of the current source 124, $V_1$ is the first level V1, $V_2$ is the second level V2, $V_3$ is the third level V3, $V_4$ is the fourth level V4, $T_1$ is the first time T1 and $T_2$ is the second time T2.

The auxiliary power controller 128 may compensate for a value corresponding to the leakage current of the capacitor 122 when calculating the capacitance of the capacitor 122 through the measurement of the first time T1, and thus the accuracy of the capacitance of the capacitor 122 may further increase.

Figure 5:
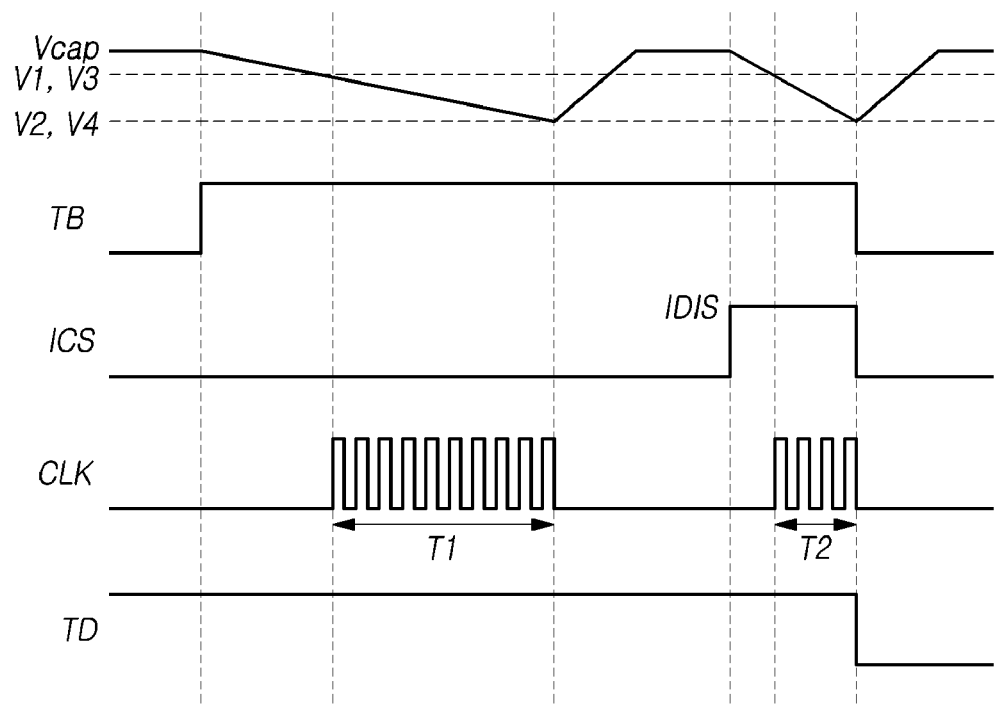
FIG. 5 illustrates voltage levels applied to a capacitor by the auxiliary power controller according to an embodiment of the disclosed technology.

FIG. 5 illustrates voltage levels applied to the capacitor 122 by the auxiliary power controller 128 according to the embodiments of the disclosed technology.

Referring to FIG. 5, a voltage level Vcap represents the voltage level of the capacitor 122, a test enable signal TB indicates whether or not to execute a test, a discharge current ICS represents the discharge current of the current source 124, a clock signal CLK represents a signal for time measurement, and a test completion signal TD indicates whether the test has been completed or not.

The third level V3 serving as a basis for calculating the capacitance of the capacitor 122 may be the same as the first level V1, and the fourth level V4 may be the same as the second level V2.

When the third level V3 is set to be the same as the first level V1 and the fourth level V4 is set to be the same as the second level V2, the capacitance calculation process of the auxiliary power controller 128 may be simplified.

Hereinafter, FIG. 5 will be described based on the assumption that the third level V3 is set to be the same as the first level V1 and the fourth level V4 is set to be the same as the second level V2.

The auxiliary power controller 128 may charge the capacitor 122 to have a voltage level Vcap that is the same as or higher than the first level V1. At this time, the test completion signal TD may have a first value (e.g., 1 or high level) until a measurement for calculating the capacitance of the capacitor 122 ends, and the test enable signal TB may have a second value (e.g., 0 or low level) before the test for the measurement is executed.

When the auxiliary power controller 128 stops charging the capacitor 122 and thus the voltage level Vcap of the capacitor 122 starts to decrease, the test enable signal TB may be changed from the second value to the first value. In response to the test enable signal TB having the first value, the auxiliary power controller 128 performs an operation for measuring the capacitance of the capacitor 122.

The auxiliary power controller 128 may count the number of toggles of the clock signal CLK generated from a time point at which the voltage level Vcap of the capacitor 122 reaches the first level V1, and the clock signal CLK has a predetermined frequency. As the frequency of the clock signal CLK increases, a precision when measuring the first time T1 may increase.

Thereafter, when the voltage level Vcap of the capacitor 122 reaches the second level V2, the toggling of the clock signal CLK may be stopped.

The auxiliary power controller 128 may derive the first time T1 on the basis of the number of toggles of the clock signal CLK and the frequency of the clock signal CLK.

For example, when it is assumed that, in FIG. 5, the frequency of the clock signal CLK is 1 kHz and the clock signal CLK is toggled 10 times while the first time T1 is measured, the first time T1 may be 10 ms.

In order to measure the second time T2, the auxiliary power controller 128 may charge the capacitor 122 to have the voltage level Vcap that is the same as or higher than the third level V3.

The auxiliary power controller 128 may stop charging the capacitor 122 and at the same time set the discharge current ICS of the current source 124 to IDIS to discharge charges stored in the capacitor 122.

The auxiliary power controller 128 may count the number of toggles of the clock signal CLK generated from a time point at which the voltage level Vcap of the capacitor 122 reaches the third level V3. Thereafter, when the voltage level Vcap of the capacitor 122 reaches the fourth level V4, the toggling of the clock signal CLK may be stopped.

The auxiliary power controller 128 may derive the second time T2 on the basis of the number of toggles of the clock signal CLK and the frequency of the clock signal CLK.

For example, when it is assumed that, in FIG. 5, the frequency of the clock signal CLK is 1 kHz and the clock signal CLK is toggled 4 times while the second time T2 is measured, and the second time T2 may be 4 ms.

After the second time T2 is measured, the auxiliary power controller 128 may set the test enable signal TB and the test completion signal TD to the second value. The fact that the test completion signal TD is set to the second value may mean that the process of calculating the capacitance of the capacitor 122 is completed.

The first level V1, the second level V2, the third level V3, and the fourth level V4 may be set in consideration of the magnitude of a leakage current according to the characteristics of the capacitor 122, the value of the discharge current ICS of the current source 124, the frequency of the clock signal CLK corresponding to a precision of time measurement, and so forth.

Figure 6:
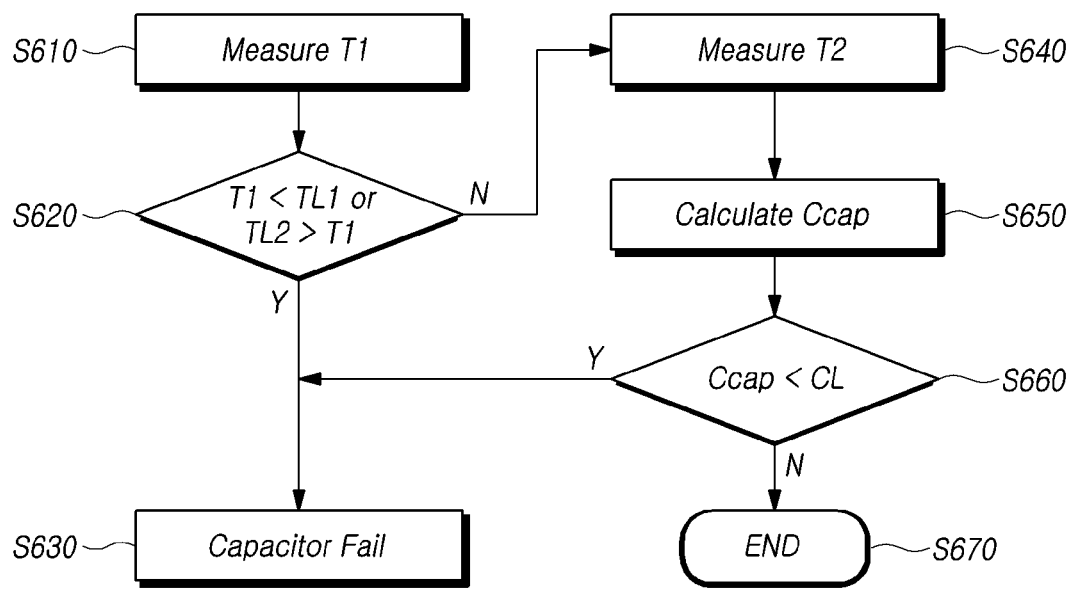
FIG. 6 is a flowchart illustrating an operation of determining a state of the capacitor by the auxiliary power controller according to an embodiment of the disclosed technology.

FIG. 6 is a flowchart illustrating an operation of determining a state of the capacitor 122 according to an embodiment of the disclosed technology. The operation of FIG. 6 will be described with reference to the auxiliary power circuit 120 illustrated in FIG. 2.

Referring to FIG. 6, the auxiliary power controller 128 of the auxiliary power circuit 120 may measure the first time T1 (S610). When the first time T1 is shorter than a first threshold time TL1 or when the first time T1 is longer than a second threshold time TL2 (S620—Y), the auxiliary power controller 128 may determine the state of the capacitor 122 as a fail state (S630). The second threshold time TL2 is longer than the first threshold time TL1.

Since the first time T1 is measured in correspondence to a leakage current of the capacitor 122, the first threshold time TL1 and the second threshold time TL2 may serve as references for determining whether the leakage current of the capacitor 122 is normal or abnormal.

If the leakage current of the capacitor 122 is larger than in a normal state, the capacitor 122 may be in a short circuit state, and if the leakage current of the capacitor 122 is smaller than in the normal state, the capacitor 122 may be in an open state.

If the capacitor 122 is in the short circuit state or the open state, even when a sudden power-off occurs in the electronic device 10, the auxiliary power circuit 120 may not provide reserve power in response to the sudden power-off.

The first threshold time TL1 and the second threshold time TL2 may be set to values for ensuring the performance of providing the reserve power to the electronic device 10 by the auxiliary power circuit 120, on the basis of leakage current characteristics of the capacitor 122, a disposition scheme of capacitors 122 such as series or parallel, the number of capacitors 122, the first level V1, and the second level V2.

For example, a maximum leakage current among the leakage current characteristics of the capacitor 122, which guarantees the maximum value of the leakage current according to the specification of the capacitor 122, may be used to determine the first threshold time TL1.

For another example, when at least two capacitors 122 are used, a leakage current may vary depending on the disposition scheme of the capacitors 122 such as series or parallel. When the capacitors 122 are disposed in parallel, a leakage current of the capacitors 122 may increase. In this case, if the first threshold time TL1 is set as a reference for only one capacitor 122, the state of the capacitors 122 may be determined as a false fail state. Accordingly, as the capacitors 122 are disposed in parallel and the number of capacitors 122 increases, the first threshold time TL1 may be set to be larger.

In addition, the first time T1 may vary depending on a difference between the first level V1 and the second level V2. For example, if the difference between the first level V1 and the second level V2 is larger, the first time T1 may increase, and the first threshold time TL1 and the second threshold time TL2 may also be set to be larger in correspondence to the first level V1 and the second level V2 so as to prevent the state of the capacitors 122 from being determined as the false fail state.

The auxiliary power controller 128 may determine whether the state of the capacitor 122 is the fail state, by only measuring the first time T1 without calculating the capacitance of the capacitor 122. Therefore, when the capacitor 122 is determined as in the fail state by only measuring the first time T1, the auxiliary power controller 128 may not measure the second time T2.

When the first time T1 is equal to or longer than the first threshold time TL1 and is equal to or shorter than the second threshold time TL2 (S620—N), the auxiliary power controller 128 may measure the second time T2 (S640).

The auxiliary power controller 128 may calculate the capacitance Ccap of the capacitor 122 on the basis of the first time T1, the second time T2, and the first level V1, the second level V2, the third level V3, the fourth level V4, and the discharge current ICS of the current source 124 used for the measurement of the first time T1 and the second time T2 (S650).

When the calculated capacitance Ccap of the capacitor 122 is smaller than a reference threshold capacitance CL (S660—Y), the auxiliary power controller 128 may determine the state of the capacitor 122 as the fail state (S630).

The reference threshold capacitance CL may vary depending on the configuration of the electronic device 10, and may be set to a value for ensuring the reliability of the electronic device 10 through a power loss protection operation.

When the capacitance Ccap of the capacitor 122 is smaller than the reference threshold capacitance CL, it cannot be guaranteed that a corresponding power loss protection operation is properly performed when a sudden power-off occurs in the electronic device 10. Thus, the reliability of the electronic device 10 may decrease.

On the other hand, when the capacitance Ccap of the capacitor 122 is equal to or larger than the reference threshold capacitance CL (S660—N), the determination of the state of the capacitor 122 may be ended (S670).

When the state of the capacitor 122 is determined as the fail state, the electronic device 10 may perform an operation, prepared for the occurrence of the sudden power-off to secure the reliability of data without receiving the reserve power from the capacitor 122, wherein the operation may include flushing data temporarily stored in a buffer into a memory device of the memory unit 200 or performing a force unit access (FUA) of forcibly accessing the memory device without going through the buffer.

Figure 7:
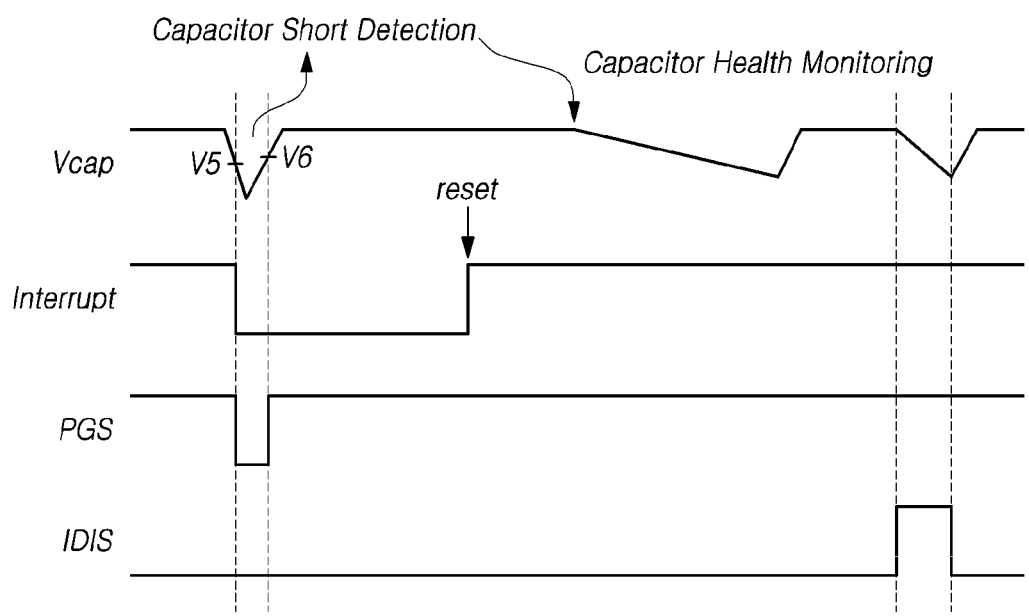
FIG. 7 illustrates an operation of detecting a short circuit state of the capacitor according to an embodiment of the disclosed technology.

FIG. 7 illustrates an operation of detecting a short circuit state of the capacitor 122 according to the embodiment of the disclosed technology.

Referring to FIG. 7, when the short circuit state is detected in the capacitor 122, the auxiliary power controller 128 may monitor the state of the capacitor 122.

When the voltage level Vcap of the capacitor 122 in operation falls below a fifth level V5, the auxiliary power controller 128 may generate an interrupt signal to notify the other components of the electronic device 10 of an abnormal operation. Also, the auxiliary power controller 128 may change a power good signal PGS from a first value to a second value. The interrupt signal may be reset after a predetermined time has elapsed from the generation of the interrupt signal.

When the voltage level Vcap of the capacitor 122 rises above a sixth level V6 after falling below the fifth level V5, the auxiliary power controller 128 may change the power good signal PGS from the second value to the first value.

When the power good signal PGS is recovered from the second value to the first value, the auxiliary power controller 128 may perform an operation of monitoring the state of the capacitor 122. The fact that the power good signal PGS is recovered from the second value to the first value may mean that the voltage level Vcap formed in the capacitor 122 is sufficiently recovered to measure the first time T1 and the second time T2.

The operation of monitoring the state of the capacitor 122 may include measuring the first time T1 and the second time T2, calculating the capacitance Ccap of the capacitor 122 on the basis of the first level V1, the second level V2, the first time T1, the third level V3, the fourth level V4, the second time T2, and the discharge current ICS of the current source 124, and determining the state of the capacitor 122 on the basis of the capacitance Ccap of the capacitor 122.

By determining the state of the capacitor 122 through calculating the capacitance Ccap of the capacitor 122 after the operation of detecting the short circuit state of the capacitor 122 is completed, the auxiliary power controller 128 may secure the reliability of the capacitor 122.

Figure 8:
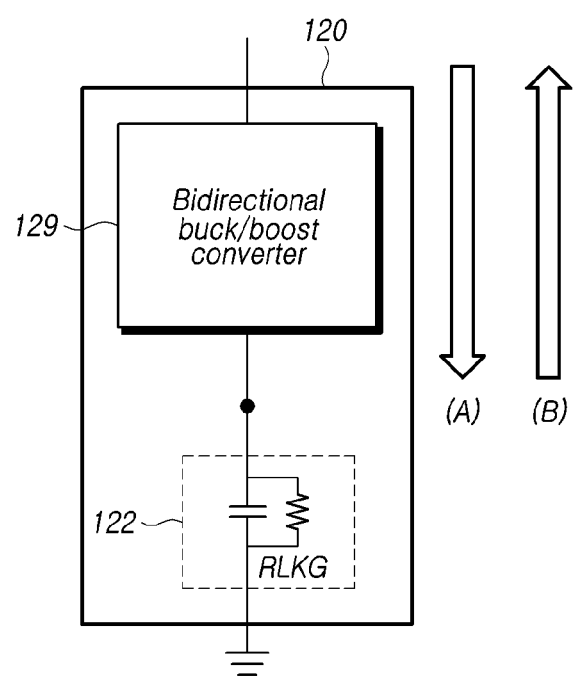
FIG. 8 illustrates a bidirectional buck/boost converter according to an embodiment of the disclosed technology.

FIG. 8 illustrates an auxiliary power circuit 120 including a bidirectional buck/boost converter according to an embodiment of the disclosed technology. The auxiliary power circuit 120 illustrated in FIG. 8 may correspond to the auxiliary power circuit 120 shown in FIG. 1.

Referring to FIG. 8, the auxiliary power circuit 120 may include a bidirectional buck/boost converter 129, which charges a capacitor 122 and provides reserve power charged in the capacitor 122 to a power management circuit, e.g., 110 of FIG. 1, when a sudden power-off occurs.

A buck/boost converter is a type of DC/DC converter which may boost or lower an input voltage and output the boosted or lowered input voltage.

The bidirectional buck/boost converter 129 is a buck/boost converter that is designed to enable bidirectional power transfer. The bidirectional buck/boost converter 129 may provide power in a direction (A) when charging the capacitor 122, and may provide the reserve power stored in the capacitor 122 in a direction (B) when the sudden power-off occurs, so that the electronic device 10 operates for a predetermined time using the reserve power.

The bidirectional buck/boost converter 129 may include an inductive element, a capacitive element, a switching element, or a diode element to step up or step down an input voltage.

The bidirectional buck/boost converter 129 may perform a step-down or step-up operation by switching between a boost mode for step-up and a buck mode for step-down.

When the electronic device 10 of FIG. 1 performs a power loss protection (PLP) operation in response to the occurrence of the sudden power-off, a voltage level outputted from the auxiliary power circuit 120 and a voltage level formed in the capacitor 122 may be different from each other. The bidirectional buck/boost converter 129 may step-up or step-down a voltage formed by the capacitor 122 and output a stepped-up or stepped-down voltage so that the electronic device 10 may utilize the reserve power.

Figure 9:
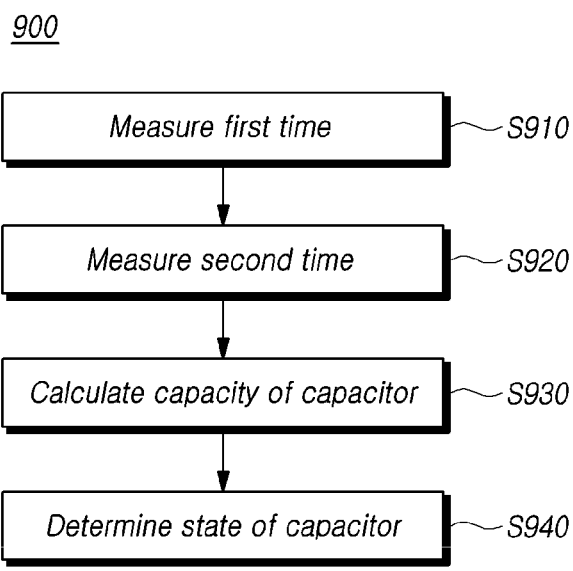
FIG. 9 illustrates a method for operating an auxiliary power circuit according to an embodiment of the disclosed technology.

FIG. 9 illustrates a method 900 of operating an auxiliary power circuit according to an embodiment of the disclosed technology. The operation 900 will be described with reference to FIG. 4.

Referring to FIGS. 4 and 9, the method 900 may include measuring a first time during which a voltage level of the capacitor 122 falls from a first level to a second level due to a leakage current of the capacitor 122 (S910). Measuring the first time may be performed by the voltage detector 126 and the auxiliary power controller 128 of the auxiliary power circuit 120.

Measuring the first time may include determining a state of the capacitor 122 as a fail state when the first time is shorter than a first threshold time or is longer than a second threshold time. The second threshold time is longer than the first threshold time.

The first threshold time and the second threshold time may be determined on the basis of the leakage current characteristics of the capacitor 122, the disposition scheme of the capacitor 122 such as series or parallel, the number of capacitors 122, the first level, and the second level.

The method 900 of operating the auxiliary power circuit 120 may include charging the capacitor 122 to a third level and measuring a second time during which the voltage level of the capacitor 122 falls from the third level to a fourth level by the leakage current of the capacitor 122 and a discharge current of the current source 124 (S920). Measuring the second time may be performed by the current source 124, the voltage detector 126, and the auxiliary power controller 128 of the auxiliary power circuit 120.

The third level may be the same as the first level, and the fourth level may be the same as the second level.

The method 900 of operating the auxiliary power circuit 120 may include calculating the capacitance of the capacitor 122 on the basis of the first level, the second level, the first time, the third level, the fourth level, the second time, and the discharge current of the current source 124 (S930). Calculating the capacitance of the capacitor 122 may be performed by the auxiliary power controller 128 of the auxiliary power circuit 120.

The capacitance of the capacitor 122 may be calculated using Equation 2.

$$C_{cap} = \frac{I_D}{\left(\frac{V_3 - V_4}{T_2} - \frac{V_1 - V_2}{T_1}\right)},$$ [Equation 2]

wherein Ccap is the capacitance of the capacitor 122, $I_D$ is the discharge current of the current source 124, $V_1$ is the first level, $V_2$ is the second level, $V_3$ is the third level, $V_4$ is the fourth level, $T_1$ is the first time, and $T_2$ is the second time.

The method 900 of operating the auxiliary power circuit 120 may include determining the state of the capacitor 122 on the basis of the calculated capacitance of the capacitor 122 (S940). Determining the state of the capacitor 122 may be performed by the auxiliary power controller 128 of the auxiliary power circuit 120.

At S940, when the capacitance of the capacitor 122 is smaller than a reference threshold capacitance, the state of the capacitor 122 may be determined as a fail state.

Figure 10:
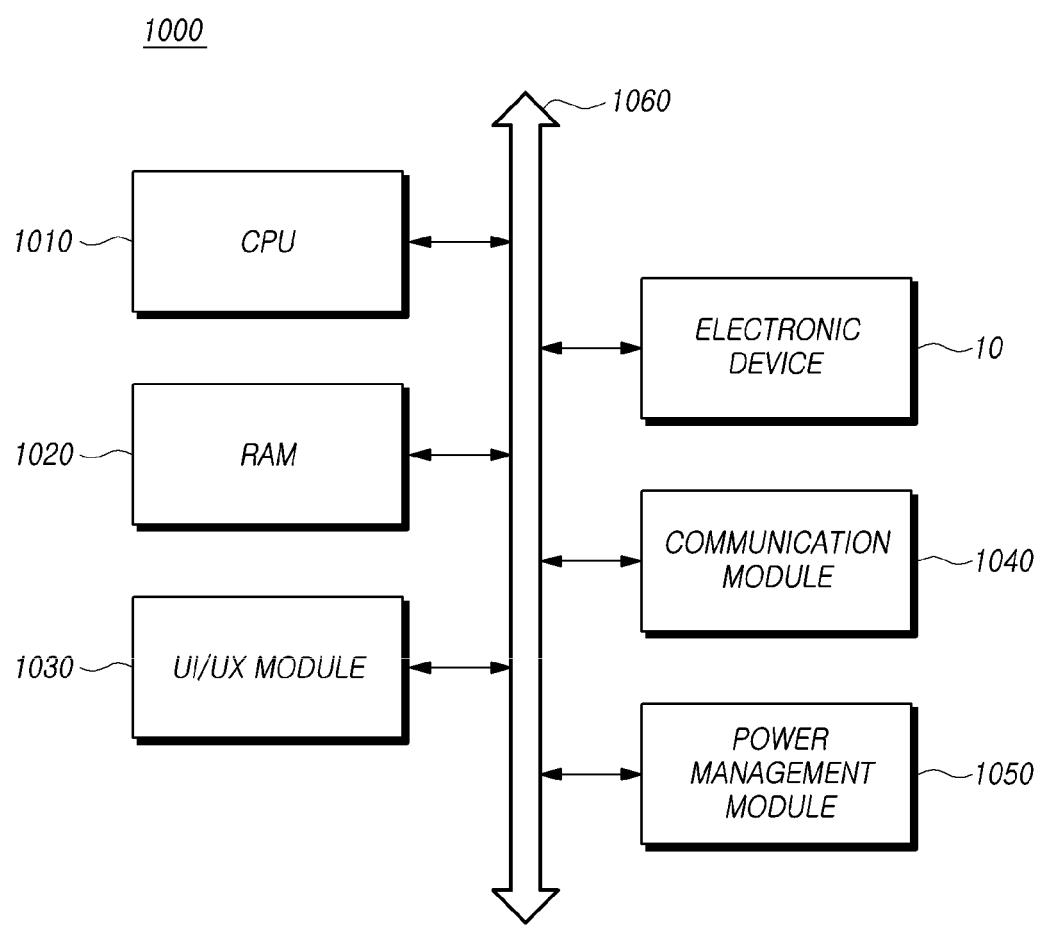
FIG. 10 illustrates a computing system according to an embodiment of the disclosed technology.

FIG. 10 illustrates a computing system according to an embodiment of the disclosed technology.

Referring to FIG. 10, the computing system 1000 based on the embodiment of the disclosed technology may include an electronic device 10, a central processing unit (CPU) 1010 for controlling general operations of the computing system 1000, a RAM 1020 for storing data and information related with operations of the computing system 1000, a UI/UX (user interface/user experience) module 1030 for providing use environment to a user, a communication module 1040 for communicating with an external device in a wired and/or wireless manner and a power management module 1050 for managing power used by the computing system 1000, which are electrically coupled to a system bus 1060.

The computing system 1000 may include a PC (personal computer), a smartphone, a mobile terminal such as a tablet, or various electronic devices.

The computing system 1000 may further include a battery for supplying an operating voltage, and may further include an application chipset, a graphic-related module, a camera image processor, a DRAM and so forth. Besides, it is obvious to those skilled in the art to which the disclosed technology pertains that the computing system 1000 may include other components.

The electronic device 10 may include not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device. The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and an FRAM (ferroelectric RAM). In addition, the electronic device 10 may be realized into various types of storage devices, and may be mounted in various electronic devices.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. An auxiliary power circuit, comprising:
at least one capacitor configured to store reserve power;
a current source configured to discharge charges stored in the capacitor;
a voltage detector configured to detect a voltage level of the capacitor; and
an auxiliary power controller configured to, when monitoring a state of the capacitor, measure a first time during which the voltage level of the capacitor falls from a first level to a second level by a leakage current of the capacitor, charge the capacitor to a third level, measure a second time during which the voltage level of the capacitor falls from the third level to a fourth level by the leakage current of the capacitor and a discharge current of the current source, calculate a capacitance of the capacitor based on the first level, the second level, the first time, the third level, the fourth level, the second time, and the discharge current of the current source, and determine the state of the capacitor based on the calculated capacitance of the capacitor.

2. The auxiliary power circuit according to claim 1, wherein the auxiliary power controller calculates the capacitance of the capacitor as follows:

$$C_{cap} = \frac{I_D}{\left(\frac{V_3 - V_4}{T_2} - \frac{V_1 - V_2}{T_1}\right)},$$

where $C_{cap}$ is the capacitance of the capacitor, $I_D$ is the discharge current of the current source, $V_1$ is the first level, $V_2$ is the second level, $V_3$ is the third level, $V_4$ is the fourth level, $T_1$ is the first time and $T_2$ is the second time.

3. The auxiliary power circuit according to claim 1, wherein the third level is equal to the first level, and the fourth level is equal to the second level.

4. The auxiliary power circuit according to claim 1, wherein the auxiliary power controller determines the state of the capacitor as a fail state when the capacitance of the capacitor is smaller than a reference threshold capacitance.

5. The auxiliary power circuit according to claim 1, wherein the auxiliary power controller determines the state of the capacitor as a fail state when the first time is shorter than a first threshold time or is longer than a second threshold time, the second threshold time being longer than the first threshold time.

6. The auxiliary power circuit according to claim 5, wherein the first threshold time and the second threshold time are determined based on leakage current characteristics of the capacitor, a disposition scheme of capacitors, and the number of capacitors.

7. The auxiliary power circuit according to claim 1, wherein the auxiliary power controller monitors the state of the capacitor when a short circuit state is detected in the capacitor.

8. An electronic device, comprising:
a memory unit configured to store data;
a power management circuit configured to provide power to the memory unit; and
an auxiliary power circuit including at least one capacitor storing reserve power and a current source discharging charges charged in the capacitor,
wherein the auxiliary power circuit is configured to supply the reserve power stored in the capacitor to the power management circuit when a sudden power-off occurs, and, when monitoring a state of the capacitor, measure a first time during which a voltage level of the capacitor falls from a first level to a second level by a leakage current of the capacitor, charge the capacitor to a third level, measure a second time during which the voltage level of the capacitor falls from the third level to a fourth level by the leakage current of the capacitor and a discharge current of the current source, calculate a capacitance of the capacitor based on the first level, the second level, the first time, the third level, the fourth level, the second time, and the discharge current of the current source, and determine the state of the capacitor based on the calculated capacitance of the capacitor.

9. The electronic device according to claim 8, wherein the auxiliary power circuit includes a bidirectional buck/boost converter which charges the capacitor and provides the reserve power stored in the capacitor to the power management circuit when the sudden power-off occurs.

10. A method of operating an auxiliary power circuit that includes at least one capacitor and a current source, the method comprising:
measuring a first time during which a voltage level of the capacitor falls from a first level to a second level by a leakage current of the capacitor;
charging the capacitor to a third level, and measuring a second time during which the voltage level of the capacitor falls from the third level to a fourth level by the leakage current of the capacitor and a discharge current of the current source;
calculating a capacitance of the capacitor based on the first level, the second level, the first time, the third level, the fourth level, the second time, and the discharge current of the current source; and
determining a state of the capacitor based on the calculated capacitance of the capacitor.

11. The method according to claim 10, wherein the calculating a capacitance of the capacitor includes calculating the capacitance of the capacitor as follows:

$$C_{cap} = \frac{I_D}{\left(\frac{V_3 - V_4}{T_2} - \frac{V_1 - V_2}{T_1}\right)}$$

where $C_{cap}$ is the capacitance of the capacitor, $I_D$ is the discharge current of the current source, $V_1$ is the first level, $V_2$ is the second level, $V_3$ is the third level, $V_4$ is the fourth level, $T_1$ is the first time, and $T_2$ is the second time.

12. The method according to claim 10, wherein the third level is equal to the first level, and the fourth level is equal to the second level.

13. The method according to claim 10, wherein the determining a state of the capacitor includes determining the state of the capacitor as a fail state when the capacitance of the capacitor is smaller than a reference threshold capacitance.

14. The method according to claim 10, further comprising:
determining the state of the capacitor as a fail state when the first time is shorter than a first threshold time or is longer than a second threshold time, the second threshold time being longer than the first threshold time.

15. The method according to claim 14, wherein the first threshold time and the second threshold time are determined based on leakage current characteristics of the capacitor, a disposition scheme of capacitors, the number of capacitors, the first level, and the second level.

* * * * *